(12) United States Patent
Green et al.

(10) Patent No.: US 7,997,044 B2
(45) Date of Patent: Aug. 16, 2011

(54) ENCLOSURE AND METHOD FOR MAKING AN ENCLOSURE

(75) Inventors: Guerry E. Green, Pawleys Island, SC (US); Robert T. Hokum, Jr., Mt. Pleasant, SC (US)

(73) Assignee: Marhaygue, LLC, Pawleys Island, SC (US)

( * ) Notice: Subject to any disclaimer, the term of this patent is extended or adjusted under 35 U.S.C. 154(b) by 1297 days.

(21) Appl. No.: 11/104,036

(22) Filed: Apr. 12, 2005

(65) Prior Publication Data

US 2005/0229531 A1    Oct. 20, 2005

Related U.S. Application Data

(60) Provisional application No. 60/563,359, filed on Apr. 19, 2004.

(51) Int. Cl.
*E04C 3/00* (2006.01)
(52) U.S. Cl. ............... 52/834; 52/835; 52/844; 52/845; 52/631; 52/588.1; 52/591.1; 220/6; 220/7
(58) Field of Classification Search .............. 52/631, 52/834, 591.1, 835, 844, 845, 588.1; 156/71, 156/247, 250; 220/6, 7, 4.33, 678
See application file for complete search history.

(56) References Cited

U.S. PATENT DOCUMENTS

| | | | |
|---|---|---|---|
| 720,941 A * | 2/1903 | Mack | 52/454 |
| 2,101,589 A * | 12/1937 | MaClean | 52/276 |
| 2,255,151 A * | 9/1941 | MacMillan | 403/266 |
| 2,532,017 A * | 11/1950 | Elmendorf | 52/316 |
| 2,680,267 A * | 6/1954 | Remstein | 52/276 |
| 2,985,075 A * | 5/1961 | Knutsson-Hall | 493/274 |
| 3,476,630 A * | 11/1969 | Viol et al. | 156/268 |
| 3,525,652 A * | 8/1970 | Tanaka | 156/51 |
| 3,539,425 A * | 11/1970 | Marburg | 156/247 |
| 3,557,029 A * | 1/1971 | Bergeron | 524/5 |
| 3,562,973 A * | 2/1971 | Gangemi | 52/71 |
| 3,911,554 A * | 10/1975 | Ford | 29/527.2 |
| 3,943,022 A * | 3/1976 | Susnjara | 156/211 |
| 4,000,594 A * | 1/1977 | Kirk, Jr. | 52/241 |
| 4,019,303 A * | 4/1977 | McAllister | 52/745.16 |
| 4,142,931 A * | 3/1979 | Viol et al. | 156/257 |
| 4,361,995 A * | 12/1982 | Buck et al. | 52/309.17 |
| 4,464,872 A * | 8/1984 | Eaton | 52/276 |
| 4,550,543 A * | 11/1985 | Valenzano | 52/309.7 |
| 4,961,454 A * | 10/1990 | Reilly, Jr. et al. | 160/344 |
| 5,226,557 A * | 7/1993 | Nelson | 206/523 |
| 5,316,165 A * | 5/1994 | Moran, Jr. | 220/62 |

(Continued)

*Primary Examiner* — Robert Canfield
*Assistant Examiner* — Matthew Gitlin
(74) *Attorney, Agent, or Firm* — Sara C. Kanos; Nexsen Pruet, LLC (57) ABSTRACT

An enclosure, such as a column for supporting a roof, is defined by plural, adjacent, beveled segments, including two outermost segments, folded and joined. An adhesive is used on the beveled edges to help hold the shape of the enclosure. In addition, the edges of the outermost segments are configured to interlock so that, with manual force and no tools, the outermost segments can be snapped together, thereby holding the enclosure while the adhesive cures. The configurations on the outermost edges are preferably made of interlocking projections and recesses, at least one of which projections is displaced slightly when the outermost segments are joined. The segments may be formed by milling a single panel while applying tape to the joints between segments to hold them in adjacent relationship. The tape may then be removed after the enclosure is formed. The preferred material for the enclosure is foamed plastic.

19 Claims, 4 Drawing Sheets

U.S. PATENT DOCUMENTS

| | | | |
|---|---|---|---|
| 5,501,351 A * | 3/1996 | Niles et al. | 220/4.21 |
| 5,555,989 A * | 9/1996 | Moran, Jr. | 220/62 |
| 5,787,669 A * | 8/1998 | Bishop | 52/591.4 |
| 5,927,841 A * | 7/1999 | Ferrari et al. | 312/348.1 |
| 6,286,198 B1 * | 9/2001 | Riesmeier | 29/525.01 |
| 2002/0144482 A1 * | 10/2002 | Henson et al. | 52/631 |
| 2003/0168452 A1 * | 9/2003 | Prutkin et al. | 220/6 |
| 2005/0167027 A1 * | 8/2005 | Lane | 156/71 |
| 2010/0236182 A1 * | 9/2010 | Mackenzie | 52/588.1 |
| 2010/0242377 A1 * | 9/2010 | Koteskey | 52/20 |

* cited by examiner

ENCLOSURE AND METHOD FOR MAKING AN ENCLOSURE

CROSS REFERENCE TO RELATED APPLICATIONS

The inventors claim the benefit of the priority date of U.S. Provisional patent application 60/563,359 filed Apr. 19, 2004, incorporated by reference herein in its entirety.

BACKGROUND OF THE INVENTION

The present invention relates generally to construction and to construction of closed exterior trim, such as columns, and furniture components, such as frames for drawers, as opposed to enclosures for land, such as fencing, and enclosures to provide shelter.

Columns serve a primary function of supporting a load, such as ceilings, decks, eves, balconies, upper-floor porches, and the like. However, they also may serve an aesthetic purpose by adding architectural detail to what might otherwise be a plain facade, and thus should have a finished appearance, perhaps even a decorative appearance as desired. A column may be solid and be comprised of an interior support post trimmed with an exterior wrap, or the column may be hollow. Hereinafter, "support post" refers to an interior, unfinished support structure. "Wrap" refers to an exterior covering to finish a support post and also to a hollow, finished column. Columns may have a square, rectangular or round cross section or may have a more complicated cross-sectional shape. The exterior of a column may also carry other architectural elements such as molding or scroll work.

In addition to columns, other manufactured items may be made in the form of an enclosure, that is, a closed structure, such as the frame of a drawer, which may have four panels that are joined to form a rectangle or square frame. This frame is fastened to a base and perhaps to a drawer front panel covered in a fine veneer.

Construction costs, particularly for building residences and small offices, are heavily affected by labor costs. Furthermore, qualified craftsmen are becoming harder to find. Because columns may take special skills and more time to build, there is a strong incentive to either minimize the number of columns, avoid them altogether, or to simplify their construction and use less expensive materials. For items made in large numbers, such as drawers for cabinets and bureaus, reduction in construction costs per unit, even if small, can translate into large savings if the total volume of goods is considered.

SUMMARY OF THE INVENTION

The present invention addresses the foregoing concerns by providing a method and apparatus for making an enclosure. The enclosure can be used in the manufacture of such things as columns and drawer frames. It is especially well suited for columns because it lends itself well to exterior construction that is done on the jobsite but the present method of making an enclosure also works well in furniture manufacturing.

In particular, the present invention comprises making an enclosure from a single panel by milling cuts in the panel to define bevel-edged segments, and then folding the segments together to form a closed figure. Preferably, tape is applied to the segments at their joint to hold them in adjacent relationship. The distal ends of the opposing, outermost panel segments are configured to interlock, preferably by routing male and female connectors in them that can be snapped together to hold the outermost edges together tightly enough to preserve the shape of the enclosure. The security of the enclosure is completed by applying adhesive to the insides of the beveled edges prior to folding and snapping the outermost segments together. The mechanical closure holds as the adhesive cures.

This method can be used to make a column or to wrap a support post with a more decorative trim, or to manufacture a frame such as that used for a drawer or other furnishing. Other structures are also possible. The preferred material for the panels is a foamed polyvinyl chloride plastic. This material is easy to work with using ordinary wood-working tools, and can be infused with pigment or painted for color.

An important feature of the present invention is the mechanical closure that holds the two outermost segments together. This mechanical closure allows these segments to be snapped together, by hand and without tools or nails, and holds them together without additional securement, such as clamps, while the adhesive on the beveled edges cures. The advantage of this feature is that the enclosure can be made quickly and accurately by a single worker without particular wood-working skills. In making a column, the worker needs only to cut the panel to the right length for the column height needed, and then apply the adhesive and snap the segments together to form the column. The joint tape can be removed shortly thereafter, leaving the cured adhesive to hold the segments together and the column with a clean and finished appearance. For heavier loads, a support post can be put into position first and the segmented panel wrapped around it. Preferably, the inside surfaces of the segments have adhesive applied with a release paper on it. The release paper is peeled from the adhesive so that the segments stick to the support post and help to hold the wrap in position. The resulting column is more precisely and quickly formed and has no exposed fasteners.

Another feature of the present invention is that the panel does not have to result in column with a square cross section or even a regular polygon. Steeply beveled segment edges and shorter segments product a nearly round column.

Still another feature of the present invention is that additional architectural detail can be applied to the column in the same manner as the column was constructed simply by adding layers of wrap as molding to the exterior of the column wrap.

Other features and their advantages will be apparent to those skilled in the art of building materials from a careful reading of a Detailed Description Of The Invention accompanied by the following drawings.

BRIEF DESCRIPTION OF THE SEVERAL VIEWS OF THE DRAWINGS

The invention and its components, structure and assembly may be further understood by reference to the detailed description below taken in conjunction with the accompanying drawings in which.

DETAILED DESCRIPTION OF THE INVENTION

The present invention is a method for making an enclosure for residential or commercial construction such as columns or in furniture manufacturing, such as frames for a drawers. The enclosure is formed to make a closed shape, except on the ends. Other types of enclosures are contemplated by the present invention, such as ceiling beams, cabinetry and end tables where a closed framework is made having plural sides and is then topped with a suitable surface.

Referring now to FIGS. 1-5, the present enclosure will be illustrated as a column wrap, generally indicated by reference number 10 in the figures. In particular, in FIG. 1, there is a support post 12 made of two pieces of lumber fastened together to form a single, load-bearing member for supporting a porch roof or deck or balcony (not shown). Column wrap 10 is wrapped around support post 12 to trim it, that is, to give it a clean, finished appearance and protection from the elements. To add architectural detail, molding 14, 16, is wrapped around the top and bottom, respectively, of column wrap 10.

Figure 1:
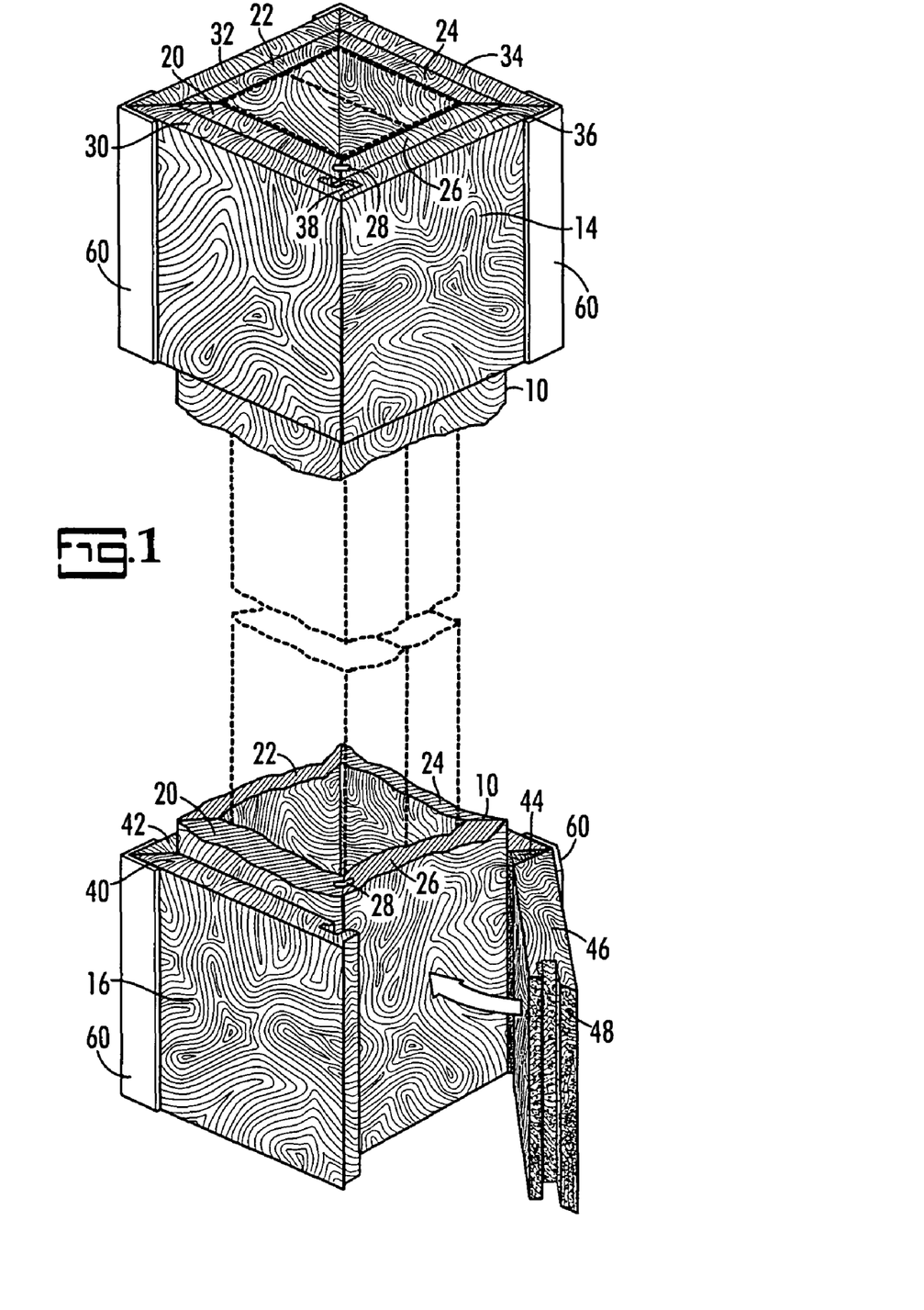
FIG. 1 is a perspective view of a square support post partially enclosed with a panel wrap to form a column according to a preferred embodiment of the present invention.

It will be seen from the figures that column wrap 10 is illustrated as being made of four segments 20, 22, 24, and 26 that are brought into engagement and joined together by a mechanical fastening at 28, which will be described in greater detail below. Similarly, molding 14, 16, is also made up of four segments 30, 32, 34, and 36, and 40, 42, 44, and 46, joined by the same type of mechanical fastening as shown in 38, 48, respectively, which, like fastening 28, closes almost door-like and snaps into position against slight resistance. Once fastened, column wrap 10 and molding 14, 16, remain fastened. Of course, although a column with four segments is illustrated, the present invention is not limited to four but any plural number greater than two segments is possible.

In order to hold the other three corners in place, tape 60 is applied to the joints as will be described below. Also, an adhesive is applied to the beveled edges of each segment so that, when they are folded together, and the adhesive cures, column wrap 10 and molding 14, 16, remain tightly joined. Tape 60 can then be peeled away and discarded. Note that tape 60 is shown as removed from column wrap 10 prior to adding molding 14, 16. The combination of these securements: the mechanical fastener, the tape and the adhesive applied to the beveled edges, enables the resulting column to be formed and to hold its enclosed shape.

For a drawer frame, a wrap similar to molding 14, 16, is formed and attached to a drawer bottom and optionally to a drawer front face. Hardware is then attached to the drawer in accordance with the manufacturer's specifications.

Figure 2:
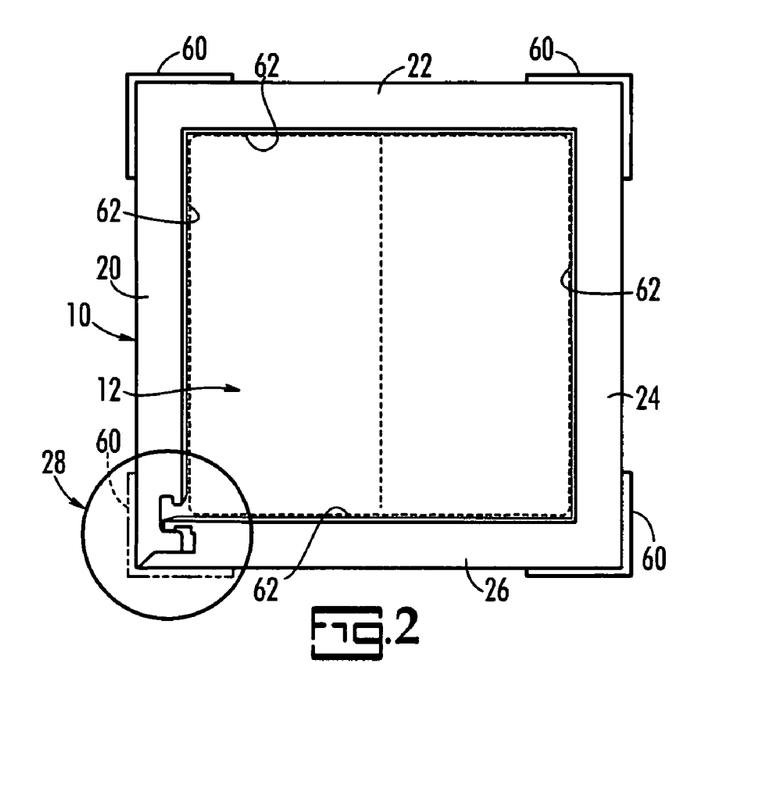
FIG. 2 is a plan view of the square support post completely enclosed with the panel wrap of FIG. 1.
Figure 4:
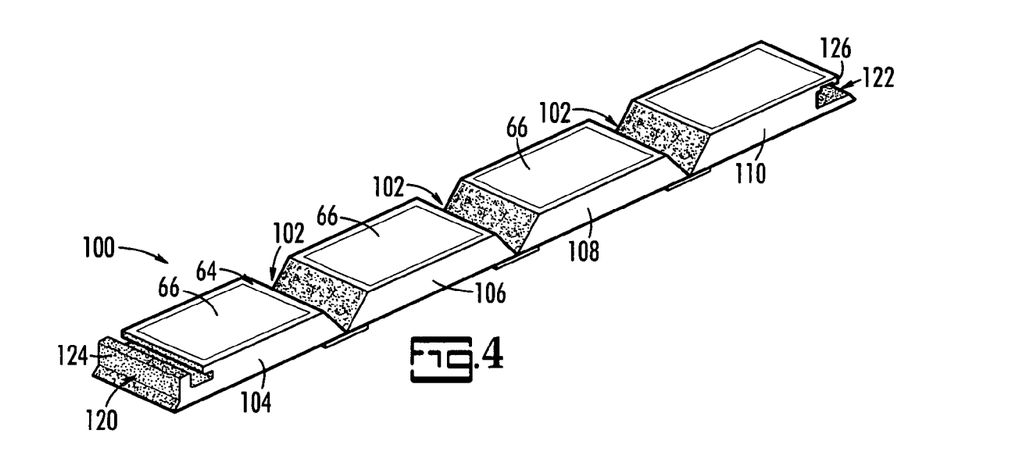
FIG. 4 is a perspective view of the top of a panel, according to a preferred embodiment of the present invention.

FIG. 2 illustrates a cross section of the column of FIG. 1, simplified by the absence of molding 14, 16. All reference characters in FIG. 2 that are the same as in FIG. 1 indicate corresponding structures. In addition, when column wrap 10 is applied to a support post 12, as opposed to being itself the support, layer of adhesive 62 is preferably applied to the inside surface 64 of wrap 10 and then a peelable layer 66 applied over adhesive layer 62, as best seen in FIG. 4. Layer 66, made of a waxed paper or a paper treated with a release agent, protects adhesive 62 and allows handling of column wrap 10 until it is peeled away just prior to the application of column wrap 10 to support post. Adhesive layer 62 helps to hold column wrap 10 to support post 12.

Figure 3:
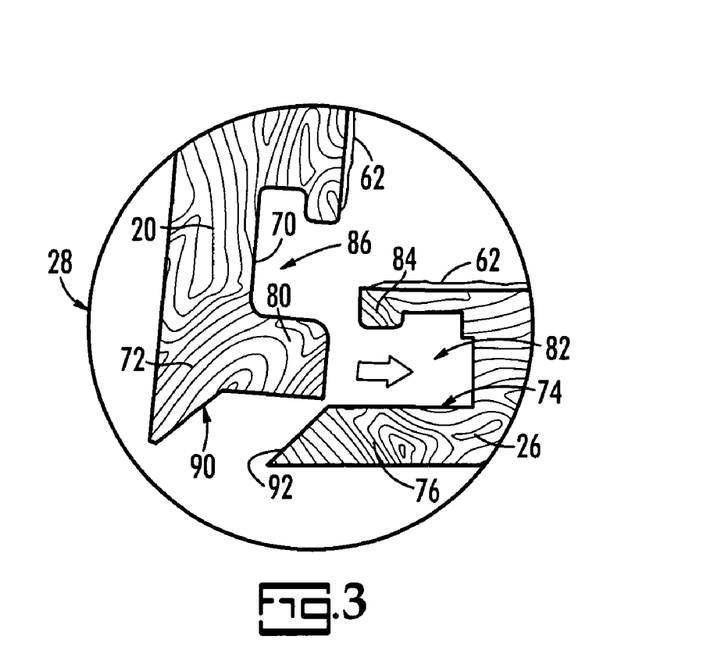
FIG. 3 is a detailed view of the mechanical securement according to a preferred embodiment of the present invention.

FIG. 3 is an enlarged view of mechanical fastener 28, shown in FIGS. 1 and 2 and which is the same as mechanical fasteners 38 and 48. Fastener 28 includes a first configuration 70 on a first outermost segment 72 and a second configuration 74 on a second outermost segment 76. Configurations 70 and 74 are designed to correspond, that is, to permit first and second outermost segments 72, 76 to be snapped together with only manual force and without tools and, once snapped together, to remain together. First and second configurations 70, 74, include projections and recesses, a projection 80 of first configuration 70 being receivable in a recess 82 of second configuration 74 and a projection 84 of second configuration 74 being receivable in a recess 86 of first configuration 70. Preferably, projection 84 is slightly displaced when first and second outermost segments 72, 76, are brought together. It is therefore important that the material of column wrap 10 and the shape of projection 84 be such that it can tolerate this slight displacement without breaking or deforming. Moreover, it is important that the material of column wrap 10 have sufficient resilience for projection 84 to apply pressure as a result of its displacement against projection to better hold first and second outermost segments 72, 76, together. A preferred material is foamed polyvinyl chloride, which is lightweight, easily worked with standard woodworking materials, and requires little maintenance.

In addition to projections and recesses that permit first and second outermost segments 72, 76, to be fastened together, first and second configurations 70, 74, are made to come together at the desired angle, typically a right angle but other angles are quite possible. As seen in FIG. 3, when face 90 on first outermost segment 72 meets face 92 on second outermost segment 76, first and second outermost segments 72, 76, are then aligned so that they form a right angle. To form other angles, the orientation of faces 90 and 92 needs to be adjusted accordingly.

Recesses 82, 86 are larger than their corresponding projections 84, 80, respectively so as to make it easier to bring first and second outermost segments together; air in recesses 82, 86, is not compressed to the point where it offers resistance to projections 84, 80. Indeed, a bead of adhesive can also be applied in recesses 82, 86, prior to bringing first and second outermost segments 72, 76, together.

FIGS. 3 and 4 show how column wrap 10 can be manufactured. A panel 100 of material can be extruded or cut to the cumulative width of the outsides of the column. V-shaped notches 102 can be milled or otherwise formed in panel 100 to define segments 104, 106, 108 and 110 of which column wrap 10 will be made. For quadrilateral columns—either square or rectangular or other four-sided shape—three notches are made, each notch formed by making an edge at 45° from the interior surface of panel 100. The outermost segments, 104 and 110, are also milled or otherwise formed to have V-notches 102 with beveled edges. V-notches 102 do not have to extend all the way through panel 100 but may stop just short of the distal side, leaving a thin skin of material to serve as a hinge that slightly rounds the corners of the resulting column 10.

Figure 5:
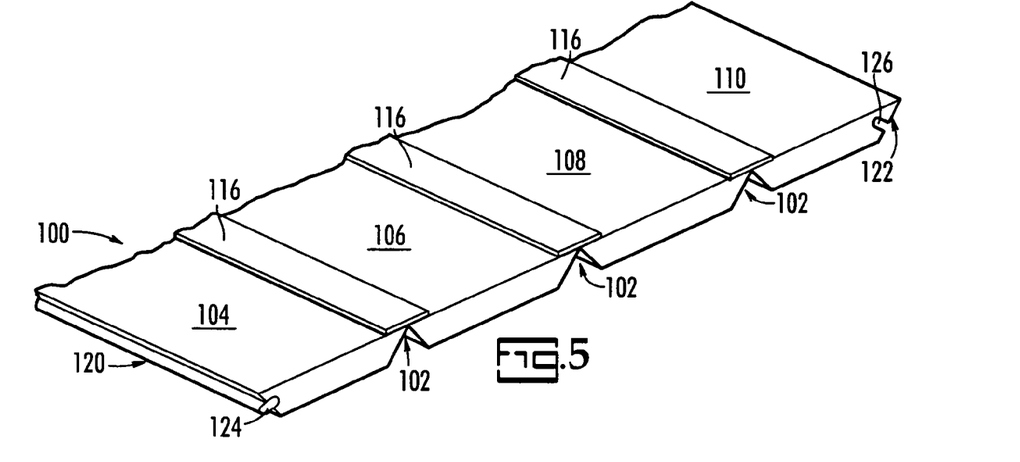
FIG. 5 is a perspective view of the bottom of a panel, according to a preferred embodiment of the present invention.

As V-notches 102 are formed, tape 116 is applied to the joints between segments, namely between segments 104 and 106, between 106 and 108, and between 108 and 110, in the example depicted in FIGS. 4 and 5, in order to hold the segments in adjacent relationship. After V-notches 102 are formed and first and second outermost edges 120, 122, are beveled, first and second outermost edges 120, 122 are cut to form first and second configurations 124, 126. In the event column wrap 100 is to be applied to a support post, as seen in FIGS. 1 and 2, a layer of adhesive 62 is applied to inside surface 64 and then covered with an easily peelable layer 66 such as a waxed paper or paper treated with a free release agent.

To form a column from panel 100, adhesive is applied to all bevelled edges. Outermost edges 120, 122 are then brought together and first and second configurations 124, 126, are snapped closed.

As indicated above, column wraps are not the only uses of the present invention. It will be clear to those skilled in furniture manufacture that many closed shapes that form part of furnishings can be made in the same manner.

Figure 6:
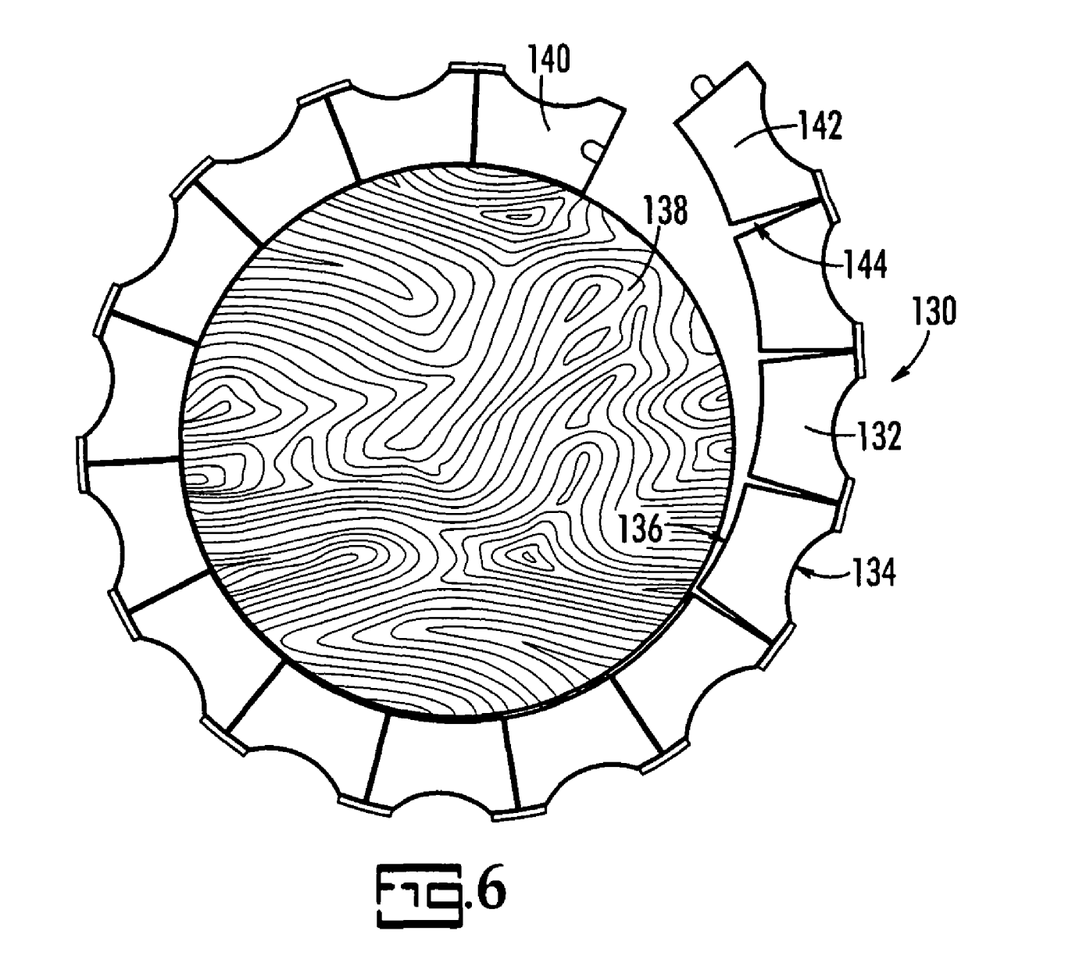
FIG. 6 is a plan view of a generally round wrap for a column, according to a preferred embodiment of the present invention.

The angles of the beveled edges and the lengths of the segments determine the shape of the column. Any regular shape and many irregular shapes are possible provided that they are closed shapes. FIG. 6 illustrates a nearly round column wrap 130 with a fluted exterior. Each segment 132 has a concave exterior surface 134 and a concave inner surface 136 so as to fit to a round support post 138 when outmost segments 140, 142 are snapped together. An adhesive is applied to the beveled edges 144 and then support post 138 is wrapped. After being snapped together, adhesive cures and holds wrap 130 to post 138.

It is intended that the scope of the present invention include all modifications that incorporate its principal design features, and that the scope and limitations of the present invention are to be determined by the scope of the appended claims and their equivalents. It also should be understood, therefore, that the inventive concepts herein described are interchangeable and/or they can be used together in still other permutations of the present invention, and that other modifications and substitutions will be apparent to those skilled in the art of construction from the foregoing description of the preferred embodiments without departing from the spirit or scope of the present invention.

What is claimed is:

1. A decorative wrap for a support, comprising:
   plural segments each having an exterior surface, an interior surface, and opposing beveled edges on said interior surfaces, said plural segments being arranged in adjacent relationship to one to another, said plural segments including two opposing outermost segments each having a distal end, said plural segments forming an enclosure when said beveled edges of adjacent plural segments are brought into engagement and said distal ends of said two opposing outermost segments are secured together;
   tape applied to joints between said plural segments to secure said plural segments in adjacent relationship; and
   a pre-milled mechanical fastener at said distal ends for holding said outermost segments together wherein said mechanical fastener includes a resilient projection formed on one of said distal ends and a corresponding recess formed on said inner surface of said outermost segment adjacent to the other of said distal ends, wherein said resilient projection is adapted to be displaced to form a frictional fit between said outermost segments when said outermost segments are pivotably engaged to form said enclosure, wherein said distal ends each have a face, and wherein said faces include a bevel so that said mechanical fastener is unexposed for a finished appearance of said enclosure as viewed from said exterior surface when said projection and said recess are brought together at a right angle.

2. An enclosure, comprising:
   plural segments, each segment of said plural segments having an exterior surface, an interior surface, and opposing beveled edges on said interior surface, said plural segments being arranged in adjacent relationship to one another, said plural segments including two opposing outermost segments each having a distal end with a face including a bevel, said plural segments adapted to form an enclosure when said beveled edges of adjacent plural segments are brought into engagement and said distal ends of said two opposing outermost segments are brought into engagement;
   a first securement carried by said plural segments for holding said adjacent beveled edges together;
   a second securement carried by said two opposing outermost segments for fastening said outermost segments together to form said enclosure, wherein said second securement includes a projection formed on one of said distal ends and a corresponding recess formed on said interior surface adjacent to the other of said distal ends, wherein said projection is adapted to form a swage fit with said recess when said distal ends of said outermost segments are rotatably engaged to form said enclosure, wherein said second securement is unexposed for a finished appearance of said enclosure as viewed from said exterior surface when said faces abut, and wherein said projection, said recess and said outermost segments are monolithic.

3. The enclosure of claim 2, wherein said first securement is adhesive applied to said opposing beveled edges of said plural segments.

4. The enclosure of claim 2, wherein said first securement is tape applied to joints between said plural segments.

5. The enclosure of claim 2, wherein said plural segments are made of foamed plastic.

6. A decorative wrap for a support, comprising:
   plural segments each having an exterior surface, an interior surface, and opposing beveled edges on said interior surfaces, said plural segments being arranged in adjacent relationship to one to another, said plural segments including two opposing outermost segments each having a distal end, said plural segments forming an enclosure when said beveled edges of adjacent plural segments are brought into engagement and said distal ends of said two opposing outermost segments are secured together;
   tape applied to joints between said plural segments to secure said plural segments in adjacent relationship; and
   a mechanical fastener at said distal ends for holding said outermost segments together wherein said mechanical fastener includes a resilient projection formed on said distal end of one of said outermost segments and a corresponding recess formed on said interior surface adjacent to said distal end of the other said outermost segments, wherein said resilient projection and said recess are dimensioned to form a frictional fit when said outermost segments are pivotably engaged to form said enclosure, wherein said distal ends each have a face including a bevel so that said mechanical fastener is unexposed for a finished appearance of said enclosure as viewed from said exterior surface when said faces abut.

7. The wrap of claim 6, wherein said tape is peelable from said joints.

8. The wrap of claim 6, wherein said plural segments are four segments including said two outermost segments.

9. The wrap of claim 6, wherein said beveled edges are beveled at an angle of 45°.

10. The wrap of claim 6, further comprising a second projection adjacent to said recess and a second recess adjacent to said resilient projection.

11. The wrap of claim 6, further comprising an adhesive applied to said beveled edges.

12. The wrap of claim 6, further comprising
an adhesive applied to said interior surface; and
a peelable paper applied to said adhesive.

13. A method for forming an enclosure, said method comprising the steps of:
providing a panel having an exterior surface and an interior surface;
forming V-notches in said interior surface of said panel to define plural segments including two outermost segments, said V-notches having opposing beveled edges, wherein each of said two outermost segments has a distal end with a face including a bevel;
configuring outermost edges of said outermost segments with a projection formed on said distal end of one of said outermost segments and a corresponding recess formed on said interior surface adjacent to said distal end of the other of said outermost segments, wherein said projection is adapted to be displaced to form a frictional fit between said outermost segments, and wherein said projection, said recess and said outermost segments are monolithic;
applying an adhesive to said beveled edges; and
rotating said plural segments together to form an enclosure of said panel, said plural segments folding at said V-notches, said projection and said recess of said faces of said opposing outermost segments interlocking by said frictional fit when said faces are engaged, wherein said interlocked projection and recess are entirely unexposed for a finished appearance of said enclosure as viewed from said exterior surface.

14. The method as recited in claim 13, further comprising the steps of:
applying tape to joints between adjacent segments to hold said segments in adjacent relationship; and
peeling said tape from said joints after said adhesive has cured.

15. The method as recited in claim 13, further comprising the steps of:
applying adhesive to said interior surface of said panel; and
applying a release paper to said adhesive.

16. The method as recited in claim 13, wherein said recess is dimensioned to be larger than said projection.

17. A decorative wrap for a support, comprising:
plural segments, each segment of said plural segments having an exterior surface, an interior surface, and opposing beveled edges on said interior surface, said plural segments being arranged in adjacent relationship with respect to one another, said plural segments including two opposing outermost segments each having a distal end with a face including a bevel, said plural segments adapted to form an enclosure when said beveled edges of adjacent plural segments are brought into engagement and said distal ends of said outermost edges of said outermost segments are brought into engagement, wherein said outermost segments include a first configuration having a projection formed on said distal end of a first outermost segment and a second configuration having a corresponding recess formed on said interior surface adjacent to said distal end of a second outermost segment, said projection and said recess adapted to form a swage fit between said first and second outermost segments when said distal ends are rotatably engaged to form said enclosure, and wherein only said exterior surface of said outermost segments is exposed for a finished appearance of said enclosure as viewed from said exterior surface when said faces abut.

18. A method for forming an enclosure, said method comprising the steps of:
providing a panel having an exterior surface and an opposing interior surface;
forming V-notches in said interior surface of said panel to define plural segments including two outermost segments, said V-notches having opposing beveled edges, wherein each of said two opposing outermost segments has a distal end having a face including a bevel;
configuring said faces of said outermost segments with recesses and corresponding projections, wherein at least one of said projections is formed on said distal end of one of said outermost segments and at least one of said recesses is formed on said interior surface adjacent to said distal end of the other of said outermost segments, and wherein said at least one projection is adapted to be displaced by said at least one recess when forced into said at least one recess;
applying an adhesive to said beveled edges; and
folding said panel together at said V-notches to rotate said distal ends of said outermost segments together so that said at least one projection interlocks to form a frictional fit with said at least one recess, and wherein said faces abut and said at least one projection and said at least one recess are unexposed for a finished appearance of said enclosure as viewed from said exterior surface.

19. An enclosure, comprising:
plural segments, each segment of said plural segments having an exterior surface, an interior surface, and opposing beveled edges on said interior surface, said plural segments being arranged in adjacent relationship to one another, said plural segments including two opposing outermost segments each having a distal end, each distal end having a face including a bevel, said plural segments adapted to form an enclosure when said beveled edges of adjacent plural segments are brought into engagement and said faces of said distal ends of said outermost segments are brought into engagement; and
a first securement carried by said plural segments for holding said adjacent beveled edges together, wherein said distal ends are configured to interlock to form a frictional fit through corresponding male and female connectors, wherein said male and female connectors include at least one male connector formed on said distal end of one of said outermost segments and at least one corresponding female connector formed on said interior surface adjacent to said distal end of the other of said outermost segments, and wherein said at least one male connector and said at least one female connector are unexposed for a finished appearance of said enclosure as viewed from said exterior surface when said faces of said distal ends are brought into engagement and said at least one male and female connectors are forced together, forming said enclosure.

* * * * *

(12) INTER PARTES REEXAMINATION CERTIFICATE (739th)

United States Patent
Green et al.

(10) Number: US 7,997,044 C1
(45) Certificate Issued: Nov. 14, 2013

(54) ENCLOSURE AND METHOD FOR MAKING AN ENCLOSURE

(75) Inventors: Guerry E. Green, Pawleys Island, SC (US); Robert T. Hokum, Jr., Mt. Pleasant, SC (US)

(73) Assignee: Marhaygue, LLC, Pawleys Island, SC (US)

Reexamination Request:
No. 95/001,891, Feb. 27, 2012

Reexamination Certificate for:
Patent No.: 7,997,044
Issued: Aug. 16, 2011
Appl. No.: 11/104,036
Filed: Apr. 12, 2005

Related U.S. Application Data

(60) Provisional application No. 60/563,359, filed on Apr. 19, 2004.

(51) Int. Cl.
*E04C 3/00* (2006.01)

(52) U.S. Cl.
USPC .............. 52/834; 52/835; 52/844; 52/845; 52/631; 52/588.1; 52/591.1; 220/6

(58) Field of Classification Search
None
See application file for complete search history.

(56) References Cited

To view the complete listing of prior art documents cited during the proceeding for Reexamination Control Number 95/001,891, please refer to the USPTO's public Patent Application Information Retrieval (PAIR) system under the Display References tab.

*Primary Examiner* — Aaron J. Lewis (57) ABSTRACT

An enclosure, such as a column for supporting a roof, is defined by plural, adjacent, beveled segments, including two outermost segments, folded and joined. An adhesive is used on the beveled edges to help hold the shape of the enclosure. In addition, the edges of the outermost segments are configured to interlock so that, with manual force and no tools, the outermost segments can be snapped together, thereby holding the enclosure while the adhesive cures. The configurations on the outermost edges are preferably made of interlocking projections and recesses, at least one of which projections is displaced slightly when the outermost segments are joined. The segments may be formed by milling a single panel while applying tape to the joints between segments to hold them in adjacent relationship. The tape may then be removed after the enclosure is formed. The preferred material for the enclosure is foamed plastic.

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-19 is confirmed.

\* \* \* \* \*